United States Patent [19]

Budzich

[11] 4,431,540

[45] Feb. 14, 1984

[54] CENTRIFUGAL FILTER SEPARATOR

[76] Inventor: Tadeusz Budzich, 80 Murwood Drive, Moreland Hills, Ohio 44022

[21] Appl. No.: 421,355

[22] Filed: Sep. 24, 1982

[51] Int. Cl.[3] .............................................. B01D 21/26

[52] U.S. Cl. ............................... 210/360.1; 210/380.1

[58] Field of Search ...................... 210/354, 377, 380.1, 210/359, 360.1, 360.2, 213, 214

[56] References Cited

U.S. PATENT DOCUMENTS 2,792,172 5/1957 Tait .................................... 210/354

*Primary Examiner*—Frank Sever

[57] ABSTRACT

A centrifugal filter separator operable to separate from oil under pressure solid contaminants by depositing them on the internal wall of a rotating drum, powered by reaction jet nozzles and to separate water from oil and extract it from the rotating drum. The rotating drum is composed of two cups held together by a shaft, passing through the axis of rotation of the drum and mounting a water extraction mechanism, which can be removed from the shaft during cleaning of the internal wall of the drum of the deposited solid contaminants.

6 Claims, 9 Drawing Figures

CENTRIFUGAL FILTER SEPARATOR

BACKGROUND OF THE INVENTION

This invention relates generally to improvements in centrifuges for cleaning liquids.

In more particular aspects this invention relates to oil cleaners of centrifuge type, in which a drum, into which the oil is fed, is mounted in bearings for rotation within a housing and is rotated about a vertical axis by the reaction of oil jets from nozzles rotating with the drum.

In still more particular aspects this invention relates to centrifugal filter separators, based on the principle of Hero's engine, in which the solid contaminants in the oil collect on the inner surface of the rotating drum, together with water, which is removed from the rotating drum through the extraction mechanism located on the drum shaft.

In still more particular aspects this invention relates to the water extraction mechanism, of a centrifugal filter based on the principle of Hero's engine, which is removable from the shaft of the drum, permitting cleaning of the internal surfaces of the drum of accumulated solid contaminants.

Centrifugal oil filters, using a rotating drum powered by reaction of oil jets, are well known in the art. In such filters the incoming oil is subjected to very high centrifugal forces, resulting in separation of solid contaminants and water. During operation of the filter the water can be removed from the space, adjacent to the inner surface of the drum, by the water conducting tubes, communicating with the hollow shaft. The solid contaminants are centrifuged to the inner surface of the drum and form a layer of thick paste, which from time to time must be removed by opening the drum and cleaning the inner surface. During this cleaning operation the centrifuged water conducting tubes interfere with the removal of the contaminants, which must be scraped from the inner surface of the drum. During those periodic cleaning operations the centrifuged water conducting tubes may be easily damaged or bent, resulting in mass inbalance of the rotating drum assembly, which in turn may generate large out-of-balance forces and severe vibrations of the filter. Also the accurate placement of the centrifuged water conducting tubes, in respect to the inner surface of the drum, is very difficult.

SUMMARY OF THE INVENTION

It is therefore a principle object of this invention to provide a centrifuged water extraction device, which is easily removable from the shaft of the drum, to facilitate the cleaning of the inner surface of the drum.

Another object of this invention is to provide a centrifuged water extraction device axially slidable in respect to the shaft of the drum, but restrained from angular displacement in respect to the shaft of the drum.

It is another object of this invention to provide a centrifuged water extraction device, mounted on the shaft of the drum and provided with radially extending water conducting tubes.

It is a further object of this invention to provide a centrifuged water extraction device having a sleeve, mounted on the shaft of the drum and radially extending water conducting tubes slidably engaging the sleeve, while being restrained from radial displacement by the inner surface of the drum.

It is a further object of this invention to provide a centrifuged water extraction device having a sleeve mounted on the shaft of the drum and radially extending water conducting tubes, with one end slidably engaging the sleeve, while the other slotted end is restrained from radial displacement by the inner surface of the drum.

Briefly the foregoing and other additional advantages of this invention are accomplished by providing a novel centrifuged water extraction device for use in a drum of a centrifugal filter, the drive of which is based on the principle of Hero's engine, which is easily detachable from the shaft of the drum, to facilitate the removal of the layer of solid contaminants from the inner surface of the drum.

Additional objects of this invention will become apparent when referring to the preferred embodiments of the invention as shown in the accompanying drawings and described in the following detailed description.

DESCRIPTION OF THE PREFERRED EMBODIMENTS

Figure 1:
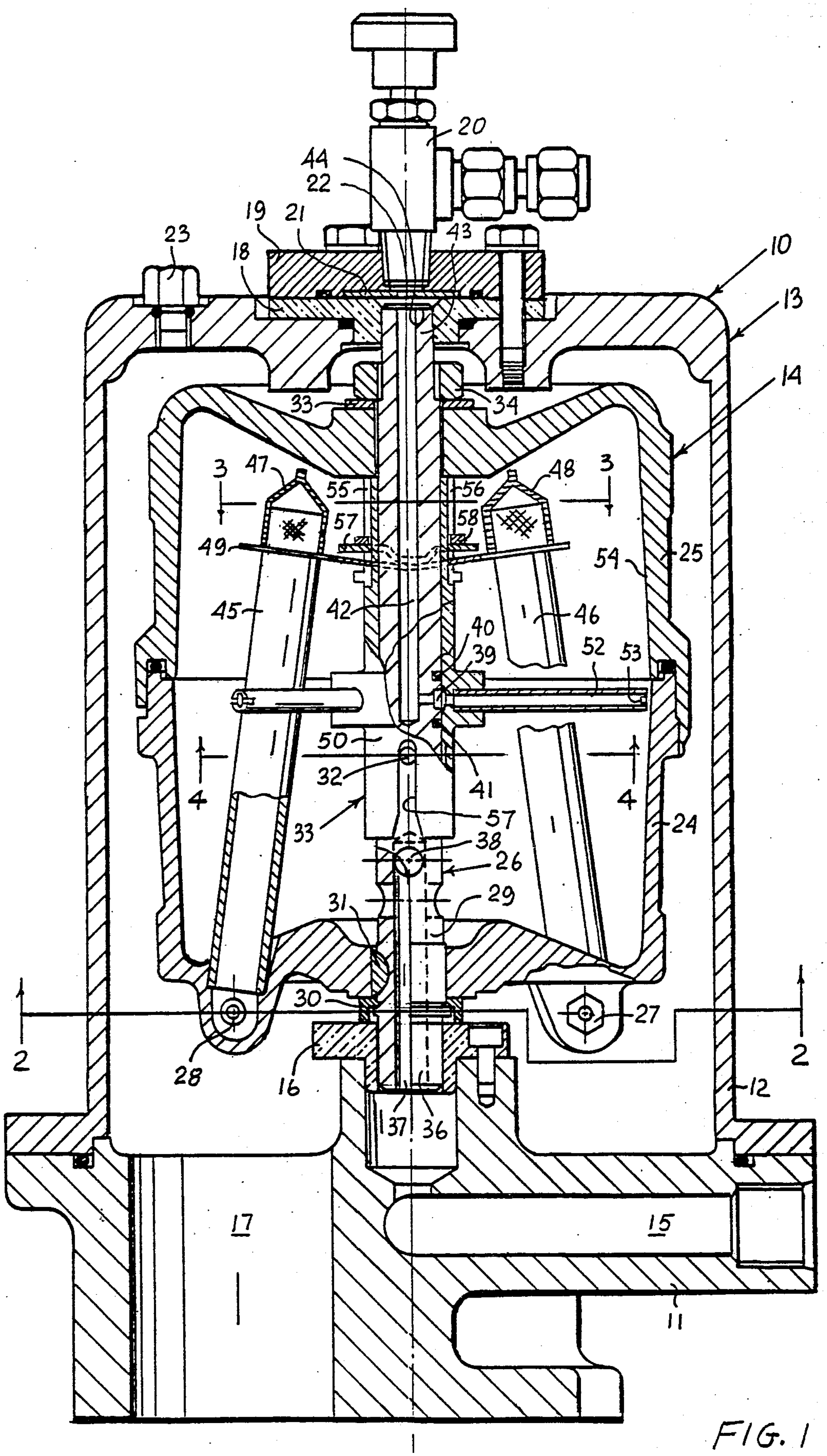
FIG. 1 is a sectional view of an embodiment of a centrifugal filter separator with one of the jet nozzles shown in external view and the sectioned water conducting tube angularly displaced by 45°.

Referring now to FIG. 1, a centrifugal filter separator assembly, generally designated as 10 and shown in partial section along the vertical axis, comprises a base 11 and a cover 12 forming together a housing, generally designated as 13, which mounts on a vertical axis a drum assembly, generally designated as 14. The base 11 is provided with inlet 15, conducting oil under pressure to a lower internal bearing 16 and an oil outlet 17. The cover 12 is provided with an upper internal bearing 18, secured in place by plate 19, mounting centrifuged water extraction valve 20. A reaction washer 21 with passage 22 is retained between the upper internal bearing 18 and the plate 19. A breather assembly 23 is mounted on the upper surface of the cover 12. The drum assembly 14 includes a lower cup 24 and an upper cup 25, secured together, in sealing engagement, by a shaft assembly, generally designated as 26. The lower cup 24 is provided with two reaction jet nozzles 27 and 28, shown also in FIG. 2. The shaft assembly 26 is provided with a shaft 29, a retainer 30, a key 31, a driving pin 32, a water extraction device assembly, generally designated as 33, a washer 34 and a nut 35. The shaft 29 is provided with a lower external bearing 36, inlet oil passages 37 and 38, collecting groove 39, seal grooves 40 and 41, water passage 42 and an upper external bearing 43, terminating in a sealing surface 44. Inlet tubes 45 and 46, provided with strainers 47 and 48, are connecting, for oil flow, the interior of the drum 14 with the reaction jet nozzles 27 and 28 and are radially spaced by a flat spring 49, which is part of the water extraction device assembly 33. The water extraction device 33, slidably engages by its sleeve 50 the shaft 29 and is constrained from rotation in respect to the shaft 29 by a driving pin 32, working in a slot 51. The water extraction device 33 is provided with centrifuged water extraction tubes 52, which connect through open ends and low slots 53, the space adjacent to an inner surface 54 of the drum 14 with water passage 42. The sleeve 50 is equipped with two driving slots 55 and 56, engaging projections in the flat spring 49 and a reaction member 57, which are located in respect to the sleeve 50 by a retaining ring 58.

Figure 2:
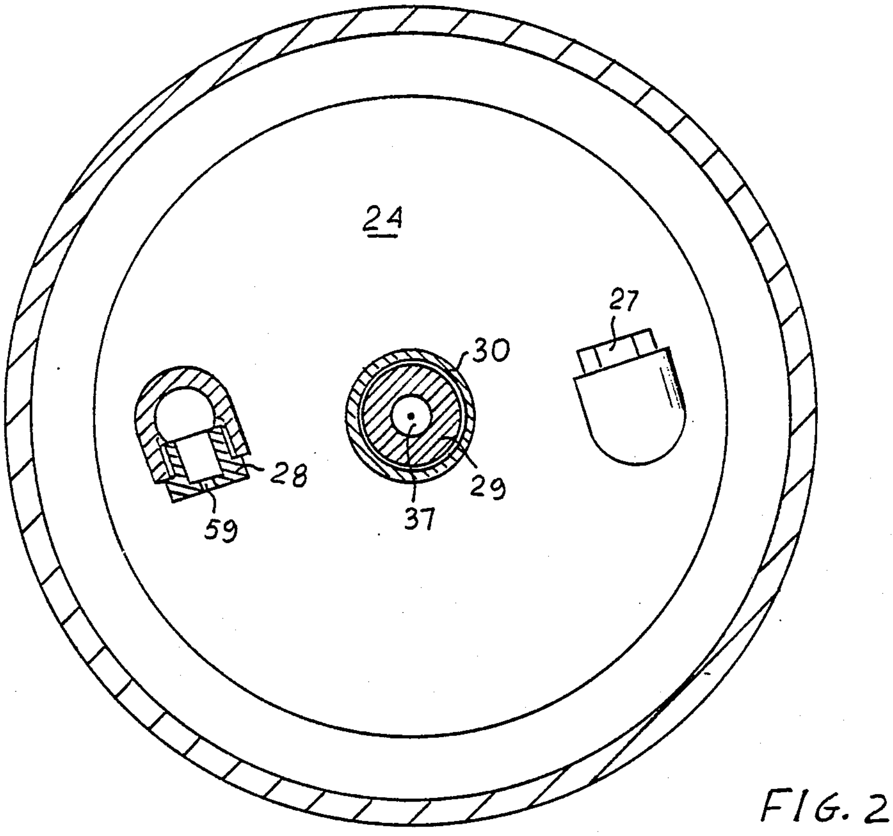
FIG. 2 is a sectional view along line 2—2 of FIG. 1 showing bottom view of the drum and location of its jet nozzles.

Referring now to FIG. 2 the reaction jet nozzle 28, shown in section, is provided with jet orifice 59.

Figure 3:
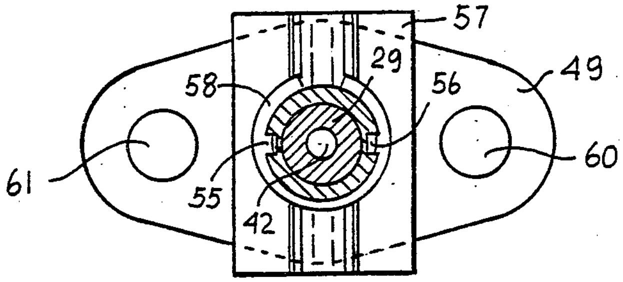
FIG. 3 is a sectional view along line 3—3 of FIG. 1 with oil conducting tubes removed.

Referring now to FIG. 3 the flat spring 49 is provided with openings 60 and 61, guiding inlet tubes 46 and 45.

Figure 4:
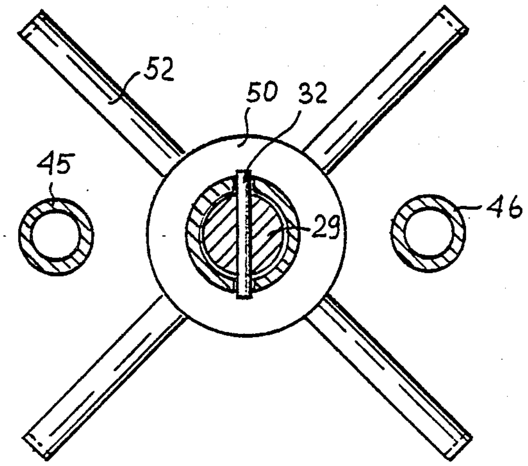
FIG. 4 is a sectional view along line 4—4 of FIG. 1 showing details of the water conducting tubes assembly.

Referring now to FIG. 4 four extraction tubes 52 are shown in their true position, in respect to inlet tubes 45 and 46.

Figure 5:
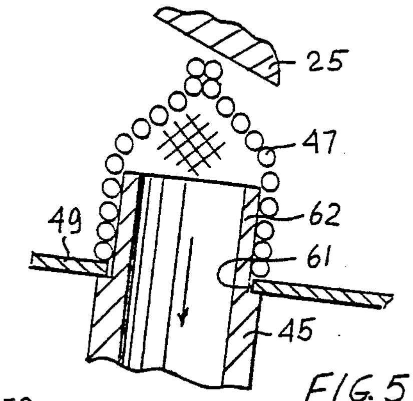
FIG. 5 is a partial sectional view of the top of an oil conducting tube with strainer in place.

Referring now to FIG. 5 the inlet tube 45, with its tube end 62, is shown engaging the opening 61 of the flat spring 49 and guiding the strainer 47.

Figure 6:
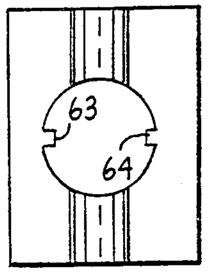
FIG. 6 is a top view of the spring support of FIG. 3.

Referring now to FIG. 6 the reaction member 57 is shown provided with projections 63 and 64, engaging driving slots 55 and 56.

Figure 7:
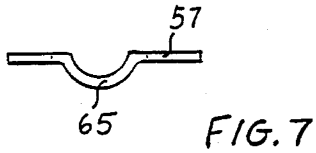
FIG. 7 is a slide view of the spring support of FIG. 6.

Referring now to FIG. 7 the reaction member 57 is shown with its curved section 65.

Figure 8:
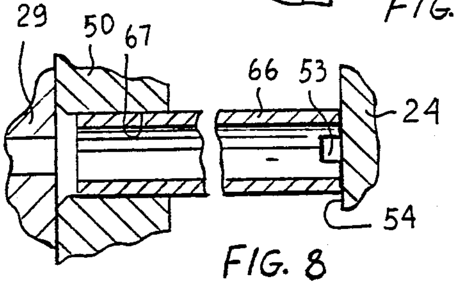
FIG. 8 is a fragmentary section of another embodiment of a water conducting tube.

Referring now to FIG. 8 an extraction tube 66 is shown in contact with the inner surface 54 of the lower cup 24, while slidably engaging a surface 67 in the sleeve 50, mounted on the shaft 29.

Figure 9:
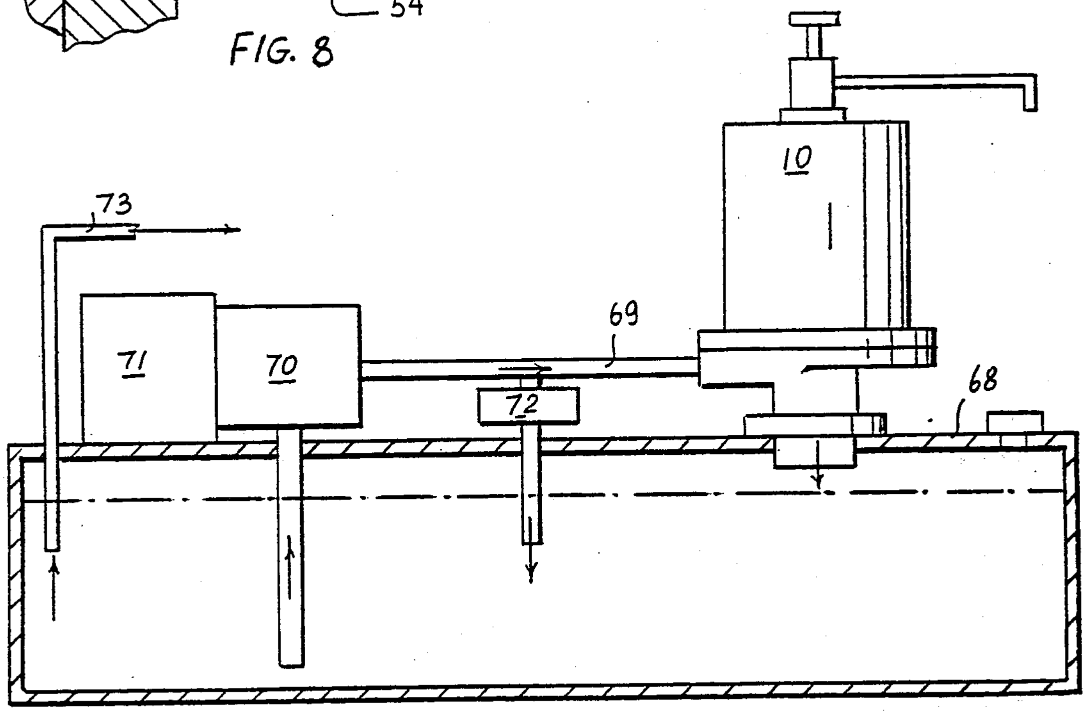
FIG. 9 is an installation drawing of the centrifugal filter separator of this invention, mounted on a reservoir and supplied with oil under pressure from a pump.

Referring now to FIG. 9 the filter separator assembly 10 is shown mounted on a reservoir 68 and connected by line 69 with a pump 70, driven by a motor 71. A relief valve 72, in a well known manner, limits the oil pressure supplied to the filter separator. A line 73 supplies a hydraulic circuit, not shown, with clean oil.

Referring now back to FIG. 1, oil under pressure is supplied from the pump 70, of FIG. 9, to the inlet 15 of the filter separator 10 and reacting on the cross-sectional area of the lower external bearing 36 lifts the drum 14 upwards to a point, at which the sealing surface 44, of the upper external bearing 43, comes in contact with the reaction washer 21. Since the cross-sectional area of the upper external bearing 43 is made smaller than the cross-sectional area of the lower external bearing 36, the drum 14 will be maintained in this position, as long as the inlet 15 is supplied with pressurized oil. Oil under pressure is transmitted from the inlet 15 through the inlet oil passage 37 to the internal space of the drum 14. Once the internal space of the drum 14 is pressurized the oil under pressure is transmitted through strainers 47 and 48 and inlet tubes 45 and 46 to the reaction jet nozzles 27 and 28. In a well known manner, a jet of oil will be ejected through the jet orifice 59 of FIG. 2, of reaction jet nozzles 27 and 28, providing a reaction torque, which will rotate the barrel 14 around its vertical axis. Under those conditions the speed of rotation of the drum 14 may exceed, say 5000 revolutions per minute, subjecting the oil contained in the drum 14 to centrifugal accelerations in excess of 2000g. In a well known manner, the solid dirt particles in the oil, together with the heavy liquids like water, will be centrifuged to the inner surface 54 of the drum 14, while the clean oil, conducted through the inlet tubes 45 and 46, will be ejected by the reaction jet nozzles 27 and 28 to the space enclosed by the housing 13, which is connected, by the outlet 17, with the system reservoir 68, shown in FIG. 9. The total assembly of the drum 14, subjected to very high speeds of rotation, must be very well balanced, or the filter separator assembly may be subjected to very severe vibrations. Since the sealing surface 44 is maintained at all times against the reaction washer 21, the liquid under pressure in the water passage 42 is effectively isolated from the space enclosed by the housing 13, while it is transmitted through passage 22 to the water extraction valve 20.

As previously stated the solid contaminants and the water are centrifuged from the oil, introduced into the drum 14 and are maintained by the centrifugal forces against the internal surface 54. The solid contaminants form a layer of thick paste on the surface 54, which may attain a thickness of over one half of an inch, while the centrifuged water forms another layer, maintained by centrifugal force on top of the layer of the solid contaminants. Periodically the cover 12 is removed and also the nut 34 is removed, lower and upper cups 24 and 25 are separated and the layer of solid contaminants scraped from the surface 54.

The centrifuged water can be extracted from the rotating drum 14 during operation of the filter separator 10. The shaft 29 mounts the drum assembly 14 in lower and upper bearings, maintains together the lower and upper cups 24 and 25 and slidably engages the water extraction device assembly 33. The water extraction device 33 is provided with the sleeve 50, slidable along the vertical axis of the shaft 29, but prevented from rotation in respect to the shaft 29 by the slot 57, engaging the driving pin 32. The sleeve 50, with four extraction tubes 52, connects, through the collecting groove 39, the space adjacent to the internal surface 54 of the drum 14, with the water passage 42 and the water extraction valve 20. The flat spring 49 is deflected by the curved section 65, of the reaction member 57, which is prevented from rotation, in respect to the sleeve 50, by projections 63 and 64, engaging driving slots 55 and 56 and maintained in position by the retaining ring 58. The flat spring 49 is provided with similar projections and keyed to the sleeve 50, see FIGS. 1, 3, 6 and 7. The deflected flat spring 49 transmits a downward force to the inlet tubes 45 and 46, while locating them radially, in respect to the sleeve 50 and the shaft 29, see FIG. 5, while also transmitting an upward reaction force to the sleeve 50, maintaining it against the upper cup 25. In a well known manner, the sleeve 50 can be located by a retaining ring in respect to the shaft 29. Then the upward reaction force of the flat spring 49 will be directly transmitted to the shaft 29, maintaining together the inlet tube assemblies.

A small amount of water, together with some solid contaminants, is lost through leakage at the sealing surface 44, maintaining the internal surface 54, in the vicinity of the slotted ends of the extraction tubes 52, relatively clear of the solid contaminants and with free access to the layer of centrifuged water. By opening the passage through the water extraction valve 20, due to the existing pressure differential, all of the centrifuged water can be drawn from the rotating drum 14.

As shown in FIG. 1, the slotted ends of the extraction tubes 52 are spaced from the inner surface 54 and retained in the sleeve 50. Rotational balancing of the water extraction device 33 of FIG. 1, because of its construction and configuration, is difficult, see FIG. 4. The mounting of the extraction tubes 66 of FIG. 8 in respect to the sleeve 50 and in respect to the inner surface 54 provides great advantages. Identical extraction tubes 66 are placed in sliding engagement on the surface 67 of the sleeve 50 and are permitted, under action of centrifugal force, to engage with their slotted ends the surface 54, ensuring an identical spacing from the center of rotation and therefore identical balance. The slots 53 provide then a free passage for extraction of the centrifuged water.

While removing by scraping the layer of solid contaminants from the surface 54 of the lower cup 24, the extraction tubes 52 are in the way and can be easily damaged or bent. To prevent this the water extraction device 33, of the present invention, can be removed from the shaft 29, together with the inlet tubes 45 and 46, permitting, during the cleaning operation, free access to the inner surface 54 of the lower cup 24. Once the water extraction device 33 is removed from the shaft 29, the individual extraction tubes 66 can also be removed for cleaning from the sleeve 50.

The centrifuged water extraction tubes 52 of FIG. 1 or 66 of FIG. 8 can be located above the partition plane between cups 24 and 25 and within the space enclosed by the cup 25. Then, once the cup 25 is removed for cleaning, the centrifuged water extraction tubes 66 can be radially removed from the surface 67, providing free access for cleaning of the lower cup 24.

Although the preferred embodiments of this invention have been shown and described in detail it is recognized that the invention is not limited to the precise form and structure shown and various modifications and rearrangements as will occur to those skilled in the art upon full comprehension of this invention may be resorted to without departing from the scope of the invention as defined in the claims.

What is claimed is:

1. A centrifugal filter separator assembly comprising a stationary housing having a pressurized oil inlet port, a clean oil outlet port, and a centrifuged water port, a rotatable drum journalled in said housing for rotation on an upright axis, means interconnecting said oil inlet port with internal space enclosed by said drum, at least one reaction jet nozzle carried by said drum and connected with said internal space, and means for removing water from said drum including means to slide radially outwardly in response to centrifugal force, sufficient to provide automatic alignment and balancing during operation, and to manually slide inwardly during rest to provide easy removal thereof from the solid contaminants.

2. A centrifugal filter separator as set forth in claim 1 wherein said means for removing water from said drum includes sleeve means slidably mounted in respect to a shaft means.

3. A centrifugal filter separator as set forth in claim 2 wherein said sleeve means includes water conducting tube means mounted on said sleeve means.

4. A centrifugal filter separator as set forth in claim 1 wherein said means for removing water from said drum includes radially spaced water conducting tube means and means slidably mounting said water conducting tube means in respect to said means for removing water from said drum.

5. A centrifugal filter separator as set forth in claim 4 wherein said radially spaced water conducting tube means has means abutting with said interior surface of said drum.

6. A centrifugal filter separator as set forth in claim 5 wherein said means abutting with said interior surface of said drum has flow slot means.

* * * * *